United States Patent [19]

DeJule et al.

[11] Patent Number: 5,363,228

[45] Date of Patent: Nov. 8, 1994

[54] OPTICAL DEVICE WITH SPATIAL LIGHT MODULATORS FOR SWITCHING ARBITRARILY POLARIZED LIGHT

[75] Inventors: Michael C. DeJule, Clifton Park, N.Y.; Thomas L. Credelle, Los Gatos, Calif.

[73] Assignee: General Electric Company, Schenectady, N.Y.

[21] Appl. No.: 26,670

[22] Filed: Mar. 5, 1993

[51] Int. Cl.$^5$ .......................... G02B 6/28; G02F 1/29
[52] U.S. Cl. .................................. 359/117; 359/128; 359/245; 359/251
[58] Field of Search ............... 359/245, 246, 250, 251, 359/257, 315, 320, 107, 128, 147, 117, 139

[56] References Cited

U.S. PATENT DOCUMENTS

| | | | |
|---|---|---|---|
| 4,410,238 | 10/1983 | Hanson | 350/347 E |
| 4,461,543 | 7/1984 | McMahon | 350/383 |
| 5,013,140 | 5/1991 | Healey et al. | 350/347 E |
| 5,175,777 | 12/1992 | Böttle | 359/128 |

FOREIGN PATENT DOCUMENTS

| | | | |
|---|---|---|---|
| 0313389 | 4/1989 | European Pat. Off. | 359/117 |
| 0202690 | 11/1983 | Japan | 359/128 |
| 2172174 | 9/1986 | United Kingdom | 359/117 |

OTHER PUBLICATIONS

"Switched Holograms for Reconfigurable Optical Interconnection: Demonstration of a Prototype Device", J. Barry McManus, Roger S. Putnam and H. John Caulfield. Applied Optics, vol. 27, No. 20, Oct. 15, 1988, pp. 4244–4250.

"Two-Dimensional Optical Architecture for Time-Delay Beam Forming in a Phased-Array Antenna", D. Dolfi, F. Michel-Gabriel, S. Bann, and J. P. Huignard. Optics Letters, vol. 16, No. 4, Feb. 15, 1991, pp. 255–257.

"Electrically Controlled Optical Switch For Multimode Fiber Applications", R. E. Wagner and J. Cheng, Applied Optics, vol. 19, No. 17, Sep. 1, 1980, pp. 2921–2925.

*Primary Examiner*—Eugene R. LaRoche
*Assistant Examiner*—Son Dinh
*Attorney, Agent, or Firm*—Enrique J. Mora; Marvin Snyder

[57] ABSTRACT

An optical switching device for switching arbitrarily polarized optical signal beams includes a plurality of polarization-independent switching cells arranged in matrix form. Each polarization-independent switching cell is independently controllable to selectively direct received optical beams along at least a selected one of two axes. The device can be three-dimensionally expanded to increase the number of output ports to which the optical beams can be selectively switched, in which case the matrices can share integrally constructed polarization-independent switching cells.

17 Claims, 4 Drawing Sheets

PRIOR ART

OPTICAL DEVICE WITH SPATIAL LIGHT MODULATORS FOR SWITCHING ARBITRARILY POLARIZED LIGHT

RELATED APPLICATIONS AND PATENTS

This application is related to the application entitled "Optical Device with Spatial Light Modulators for Switching Polarized Light", Ser. No. 07/991,607, filed Dec. 16, 1992, assigned to the assignee of the present application, and which is incorporated herein by reference.

BACKGROUND OF THE INVENTION

This invention relates to an optical switching device and, more particularly, to an electrically controlled switching device for individually directing a plurality of arbitrarily polarized optical beams to selected output ports.

Signal processing systems often employ multiple parallel processors which permit many operations to take place concurrently. These so called parallel processing architectures typically require switching devices capable of efficiently transferring the data signals between such parallel processors. It is particularly advantageous to use optical switching devices to selectively interconnect the multiple parallel processors. For example, optical signal beams provide greater operating bandwidths and superior immunity to electromagnetic interference as compared with electrical signals.

These optical switching devices must be capable of spatially switching large numbers of light beams while preserving the integrity of the signals communicated by such light beams. One approach generally used in the fabrication of these switching devices is to utilize a plurality of elementary switching cells which in combination provide the overall switching capacity of the device. In these switching devices, it is highly desirable to reduce the number of elementary switching cells required to switch a given number of light beams so that, for instance, the switching device becomes more compact while having lower fabrication costs.

An optical device for switching light beams is proposed by J. B. McManus, R. S. Putnam, and H. J. Caulfield in the paper entitled "Switched holograms for reconfigurable optical interconnection: demonstration of a prototype device", Vol 27, Applied Optics, pp. 4244–4250, Oct. 15, 1988. The device proposed by McManus et al.,(hereinafter McManus), utilizes a plurality of polarization-dependent switching cells arranged in a two-dimensional matrix which, in general, can have M columns and N rows of switching cells. Each switching cell comprises a polarizing beamsplitter and a spatial light modulator (SLM) which cooperate to selectively direct light beams externally applied to the matrix to selected outputs. Several disadvantages of the device proposed by McManus are that use of polarization-dependent switching cells can reduce light beam intensity (as may occur if a polarizer is used to polarize light to be used in a polarization-dependent system) and connections between such polarization dependent switching devices may require the use of polarization-maintaining fibers. Moreover, the device proposed by McManus is confined to a two-dimensional arrangement of switching cells (e.g., a single two-dimensional switching matrix), as McManus does not suggest how his device can be expanded into a three-dimensional arrangement of switching cells (e.g., a succession of identical two-dimensional matrices positioned parallel to each other). A device having such three-dimensional expansion capability can significantly increase the universe of selectable output ports to which the light beams can be switched. For example, if Q is the number of successive two-dimensional matrices positioned parallel to each other, then the number of selectable output ports will increase by a Q factor.

Polarization-independent types of switching devices have been suggested that enable an arbitrarily polarized light beam (i.e. an unpolarized light beam) to be selectively directed along a predetermined path. One example of such a polarization-independent switch is described by Wagner and Cheng in "Electrically Controlled Optical Switch For Multimode Fiber Applications," Applied Optics, Vol. 19, No. 17, September 1980, pp 2921–2925. However, Wagner et al. do not suggest any two-dimensional arrangement for their switches, and much less a three-dimensional switching arrangement.

Accordingly, one object of the invention is to provide a two-dimensional optical switching device which can be controlled to individually and simultaneously direct arbitrarily polarized light beams received by each of multiple polarization-independent switching cells thereof.

Another object of the present invention is to provide a polarization-independent optical switching device which can be three-dimensionally expanded to provide additional selectable output ports for the light beams switched by the device.

SUMMARY OF THE INVENTION

In accordance with the invention, an optical switching device capable of simultaneously and individually directing a plurality of externally derived arbitrarily polarized optical signal beams to a selected plurality of output ports is provided. The device comprises at least a fast switching matrix which includes a plurality of polarization-independent switching cells arranged in columns and rows. Each of the polarization-independent switching cells is independently controllable such that individual optical beams received by any given polarization-independent switching cell can respectively emerge therefrom along at least a selected one of first and second axes, in accordance with the polarization orientation of the optical beams passing therethrough. Each polarization-independent switching cell in the first column of the matrix is positioned to receive a portion of the externally derived optical beams. In a reverse mode of operation, each polarization-independent switching cell in the last row of the matrix is also capable of receiving a portion of the externally derived optical beams. Each polarization-independent switching cell in a column subsequent to the first column is positioned to receive or to pass optical beams propagating along the selected second axis with respect to a switching cell located in a preceding column of the same row. Each polarization-independent switching cell in a row preceding the last row is positioned to receive or to pass optical beams propagating along the selected first axis with respect to a cell located in the subsequent row of the same column.

Each polarization-independent switching cell comprises a first switch unit optically coupled to a spatial light modulator which in turn is optically coupled to a second switch unit. The spatial light modulator preferably includes an array of individually controllable liquid crystal pixels. The spatial light modulator and the respective switch units of each polarization-independent switching cell cooperate to propagate through the matrix the externally derived optical beams applied simultaneously to the first column or to the last row of the matrix so as to provide bidirectional communication between selected ports without mutual interference.

In one embodiment of the invention the switching device comprises a succession of substantially identical switching matrices identified by alternate odd and even designations. Each of the matrices is positioned in parallel alignment with each other across a common axis perpendicular to their rows and columns. In this embodiment, row reflecting means is capable of optically coupling each pair of consecutive matrices in which an odd designated matrix (hereinafter "odd matrix ") is followed by an even designated matrix, (hereinafter "even matrix") and column reflecting means is capable of optically coupling each pair of consecutive matrices in which an even matrix is followed by an odd matrix. In accordance with this embodiment, in each polarization-independent switching cell of an odd matrix the spatial light modulator and the respective switch units cooperate to propagate optical beams through the odd matrix in ascending column order within a row and in ascending row order within a column, while in each polarization-independent switching cell of an even matrix the spatial light modulator and the respective switch units therein cooperate to propagate signal beams through the even matrix in descending row order within a column and in descending column order within a row.

In another aspect of the invention, each polarization-independent switching cell is capable of simultaneously directing each received optical beam along each of the two selected axes. In accordance with this aspect of the invention, each of the externally derived optical signal beams can be simultaneously directed to at least two selected output ports.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawings in which like characters represent like pans throughout the drawings, and in which:

DETAILED DESCRIPTION OF THE INVENTION

Figure 1:
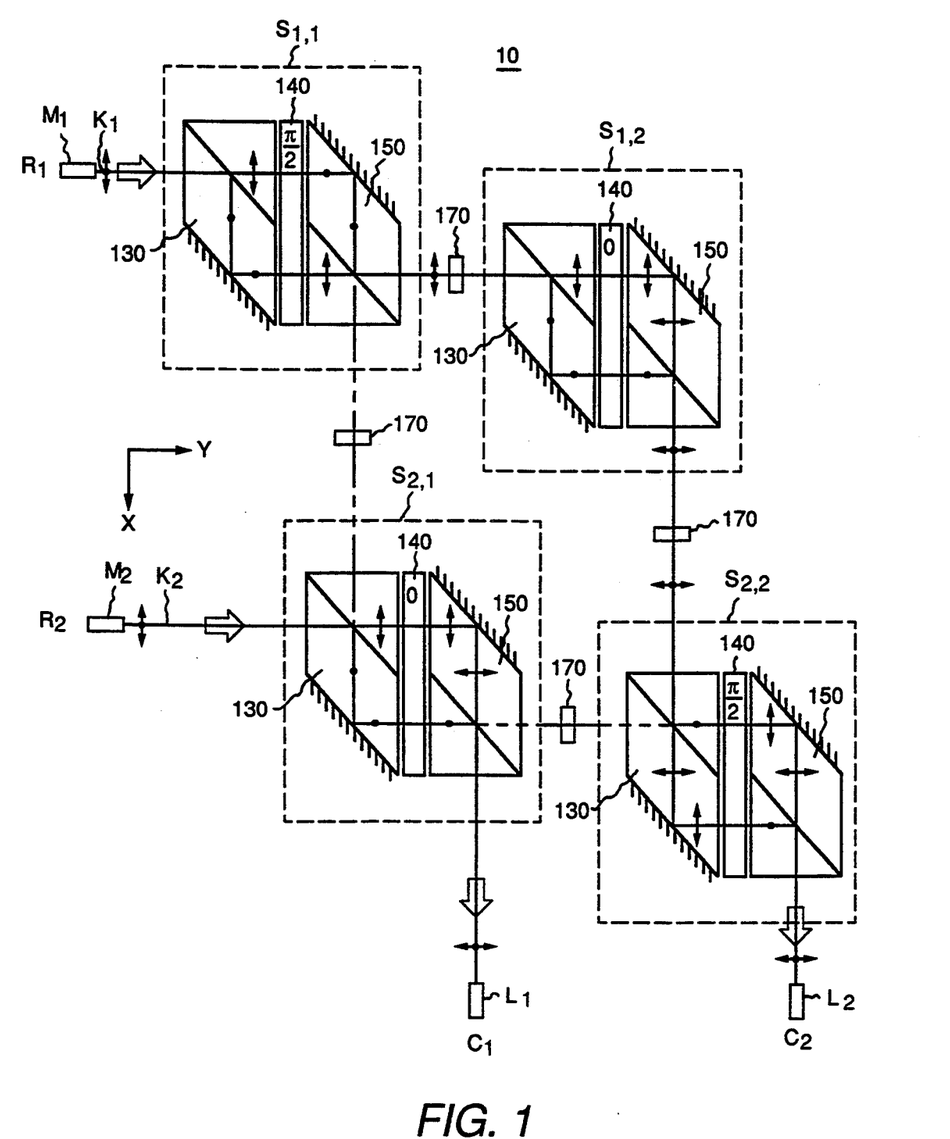
FIG. 1 is a schematic diagram showing a front elevation view of an optical switching device in accordance with an embodiment of the present invention.

FIG. 1 shows an optical switching device 10 capable of simultaneously and individually directing a plurality of externally derived arbitrarily polarized optical signal beams, e.g., $K_1$ & $K_2$, to a selected plurality of output ports, e.g., $L_1$ & $L_2$. As illustrated in FIG. 1, switching device 10 comprises four polarization-independent switching cells (PISCs) $S_{1,1}$, $S_{1,2}$, ... $S_{2,2}$ arranged to form a two-dimensional switching matrix having two columns $C_1$-$C_2$ and two rows $R_1$-$R_2$. In general $S_{i,j}$ identifies a PISC located in the $i^{th}$ row and the $j^{th}$ column of a switching matrix comprising a plurality MxN of PISCs arranged in M columns and N rows.

Each PISC $S_{i,j}$, as illustrated in FIGS. 2A–2D, typically comprises a first switch unit 130 optically coupled to a spatial light modulator (SLM) 140 which is in turn optically coupled to a second switch unit 150. As used herein, "optically coupled" refers to an arrangement in which one or more optical beams are directed from one optical component to another in a manner which maintains the integrity of the signal carried by the optical beams. First switch unit 130 comprises respective polarizing beamsplitter (PBS) means, such as a cube PBS 132 coupled to an associated reflector 134; second switch unit 150 similarly comprises respective polarizing beamsplitter means, such as a cube PBS 152 coupled to an associated reflector 154. As used herein polarizing beamsplitter means refers to the entire PBS assembly, not just the interface of the prisms at which light separation or combination occurs.

Each SLM typically includes a two-dimensional array of individually controllable pixels illuminated by optical beams passing through a respective PISC. Each pixel comprises a material capable of altering the polarization orientation of linearly polarized light passing therethrough. For explanatory purposes, and not by way of limitation, it will be assumed that each pixel comprises a twisted nematic liquid crystal (LC) material. It will be understood by those skilled in the an that other materials will be equally effective as polarization rotators (e.g., materials exhibiting the property known as the Faraday effect or ferroelectric smectic LCs). Alternatively, a linear nematic LC (i.e., untwisted) acting as a half-wave retarder can be used to rotate the polarization of light. The LC in each pixel may operate so that when a control signal (not shown) applied thereto has a zero voltage the molecular orientation of the LC has a helical twist angle of 90°. In this twisted mode of operation, the molecular orientation of the LC causes a 90° rotation of the polarization orientation of the optical beam passing through the pixel. When the control signal applied to the pixel reaches a predetermined maximum voltage, the molecular orientation of the LC aligns approximately parallel to the optical beam passing therethrough and thus the optical beam passing through the pixel does not experience a polarization rotation. Thus, each pixel in the SLMs can be set to selectively rotate or not the polarization orientation of the optical beam passing therethrough.

As seen in FIG. 1, each PISC in the first column $C_1$ is positioned to receive a portion of the externally derived optical signal beams, e.g., $K_1$ & $K_2$. As indicated by the single headed arrows along the optical beams shown in FIG. 1, and as will be explained in greater detail, optical beams applied to the first column of PISCs can be selectively directed through the switching matrix in ascending column order within a row and in ascending row order within a column so that externally applied optical beams reach selected output ports $L_1$ & $L_2$ associated with the last row of PISCs. In a reverse mode of operation, externally derived optical signal beams can be applied to each PISC in the last row R₂ through ports L₁ and L₂, here functioning as input ports. The input or output function of such ports being solely defined in terms of the direction of the light beams passing therethrough. In the reverse mode of operation, the applied beams can be selectively directed through the switching matrix in descending row order within a column and in descending column order within a row (i.e., in directions opposite to the single headed arrows along the optical beams shown in FIG. 1) so as to reach selected ports M₁ & M₂ associated with the first column of PISCs.

Figure 2A:
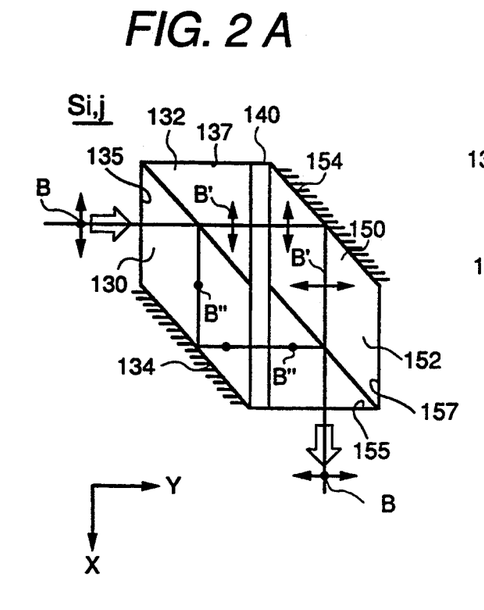
FIGS. 2A through 2D are schematic diagrams showing respective front elevation views of a polarization-independent switch in accordance with the prior art.

The conventional PISC illustrated in FIGS. 2A-2D enables arbitrarily polarized optical beams received by a fast or a second input face 135 and 137, respectively, of the PISC to be selectively switched along either a first or a second axis (here the X and Y axes, respectively). By way of example and not of limitation, a representative arbitrarily polarized optical beam "B" is illustrated in FIG. 2A incident on the first input face 135 of PISC $S_{i,j}$. This arbitrarily polarized optical beam may comprise both "p" polarized light (e.g., having a polarization orientation parallel to the plane of the figure and represented by the double headed arrows across the optical beam) and "s" polarized light (e.g., having a polarization orientation perpendicular to the plane of the figure and represented by the solid dots on the light beam).

Beam B is split into a constituent pair of beams of opposite linear polarization in polarizing beamsplitter 132, represented as B' and B". Beam B' passes through first switch unit 130 along substantially the same path as incident beam B and into a respective pixel in SLM 140; beam B" is deflected in PBS 132 such that it is incident on reflector 134 and then optically coupled to a different respective pixel in SLM 140. In FIGS. 2A-2D, cube PBSs are shown and thus the angle of deflection is typically about 90°; alternatively, other types of PBSs may be used, such as Thompson PBSs, in which the deflection angle is other than 90°. As illustrated in FIG. 2A, the two respective pixels in SLM 140 through which beams B' and B" pass are set not to rotate their polarization orientation and thus such beams emerge from SLM 140 with their respective original polarization orientation which is carried to second switch unit 150. Beam B' is incident on reflector 154 and is deflected into PBS 152; beam B" passes from SLM 140 directly into PBS 152. The polarization orientation of beams B' and B" is such that they are combined in PBS 152 to form one unpolarized beam B that emerges from PISC $S_{i,j}$ through a first output face 155 along the selected first axis (here the X axis).

Figure 2B:
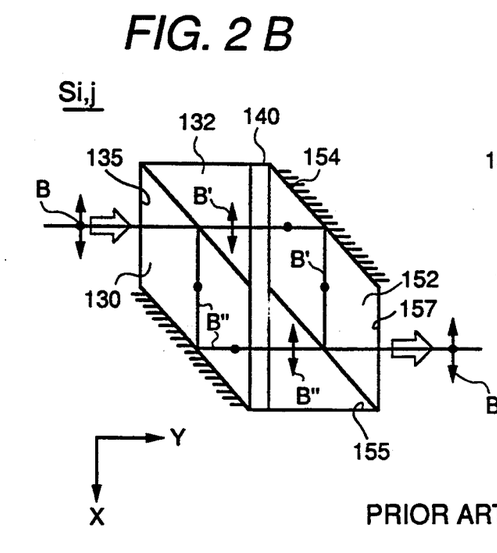

FIG. 2B illustrates a PISC $S_{i,j}$ with the respective pixels in SLM 140 set to cause a 90° polarization rotation to light passing therethrough. The operation is as described above with the exception that beams B' and B" undergo a 90° polarization rotation as they pass through SLM 140. In accordance with such 90° polarization orientation beams B' and B" are combined in PBS 152 to form one unpolarized beam B that emerges from PISC $S_{i,j}$ through a second output face 157 along the selected second axis (here the Y axis).

Figure 2C:
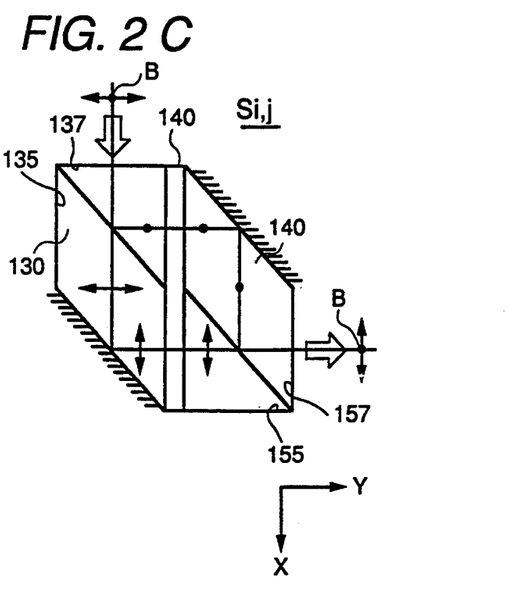
Figure 2D:
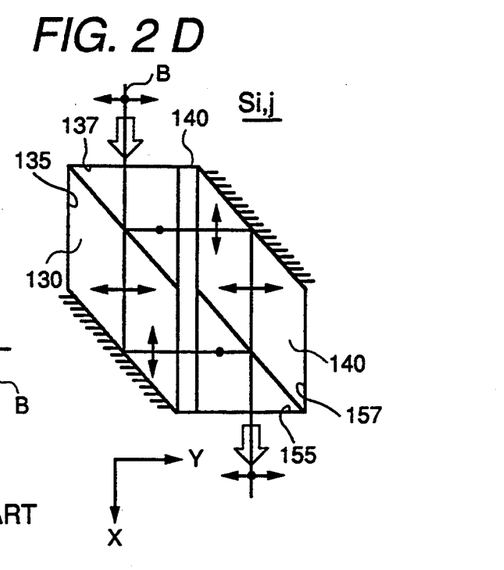

FIGS. 2C and 2D illustrate the operation of PISC $S_{i,j}$ with its SLM 140 set for no polarization rotation, and 90° polarization rotation, respectively, when optical beam B is received along the second input face 137 of PISC $S_{i,j}$. The operation is identical to that described above with the exception that the no polarization rotation setting of SLM 140 results in the unpolarized output beam emerging along the second axis (here the Y axis) and the 90° polarization rotation setting of SLM 140 results in an unpolarized output beam emerging along the first axis (here the X axis).

FIG. 1 illustrates the operation of the switching matrix in the context of optical signal beams K₁ and K₂ received, respectively, by PISCs $S_{1,1}$ and $S_{2,1}$, each in the first column of the switching matrix. For purposes of explanation of operation, it will be assumed that the respective pixels in SLM 140 of PISCs $S_{1,1}$ and $S_{2,2}$ are set to cause a 90° polarization rotation to optical beams passing therethrough (the 90° polarization rotation being indicated by the Π/2 label in the SLMs shown in FIG. 1), while the SLM of all remaining PISCs are set not to rotate the polarization of light passing therethrough (the no polarization setting being indicated by the 0 label in the SLMs shown in FIG. 1). It should be understood that while FIG. 1 illustrates only one light beam received by each PISC for simplicity of illustration, each PISC can simultaneously handle many light beams, for example, more than about 10⁴ light beams per cm².

In accordance with the aforementioned selected settings, recombined arbitrarily polarized beam K₁ emerges from second switch unit 150 of PISC $S_{1,1}$ along the Y axis. PISC $S_{1,2}$ located in a column subsequent to the first column C₁ is optically coupled to receive the optical beam from PISC $S_{1,1}$ passed along the Y axis. Since the respective pixels in the SLM of PISC $S_{1,2}$ are set not to rotate the polarization orientation of optical beams passing therethrough, the recombined beam K₁ emerges from PISC $S_{1,2}$ along the X axis. PISC $S_{2,2}$ located in a row subsequent to the first row is optically coupled to receive the optical beam from cell $S_{1,2}$ passed along the X axis and since the respective pixels of SLM 140 in cell $S_{2,2}$ are set to rotate by 90° optical beams passing therethrough, recombined beam K₁ emerges from PISC $S_{2,2}$ along the X axis so as to reach a selected output port (e.g., L₂). Again referring to FIG. 1, analysis analogous to the one described in reference to beam K₁ indicates that beam K₂ propagates through the switching matrix to a selected output port (e.g., L₁). In FIG. 1, a phantom line between PISCs indicates other possible optical paths for light beams propagating through the matrix but not selected here, given the assumed selected settings. Focusing of the multiple light beams passing between each pair of adjacent PISCs is desirable to minimize crosstalk. An optical lens 170, or alternatively a lens array, can be advantageously optically coupled between adjacent PISCs to focus the light beams.

Figure 3A:
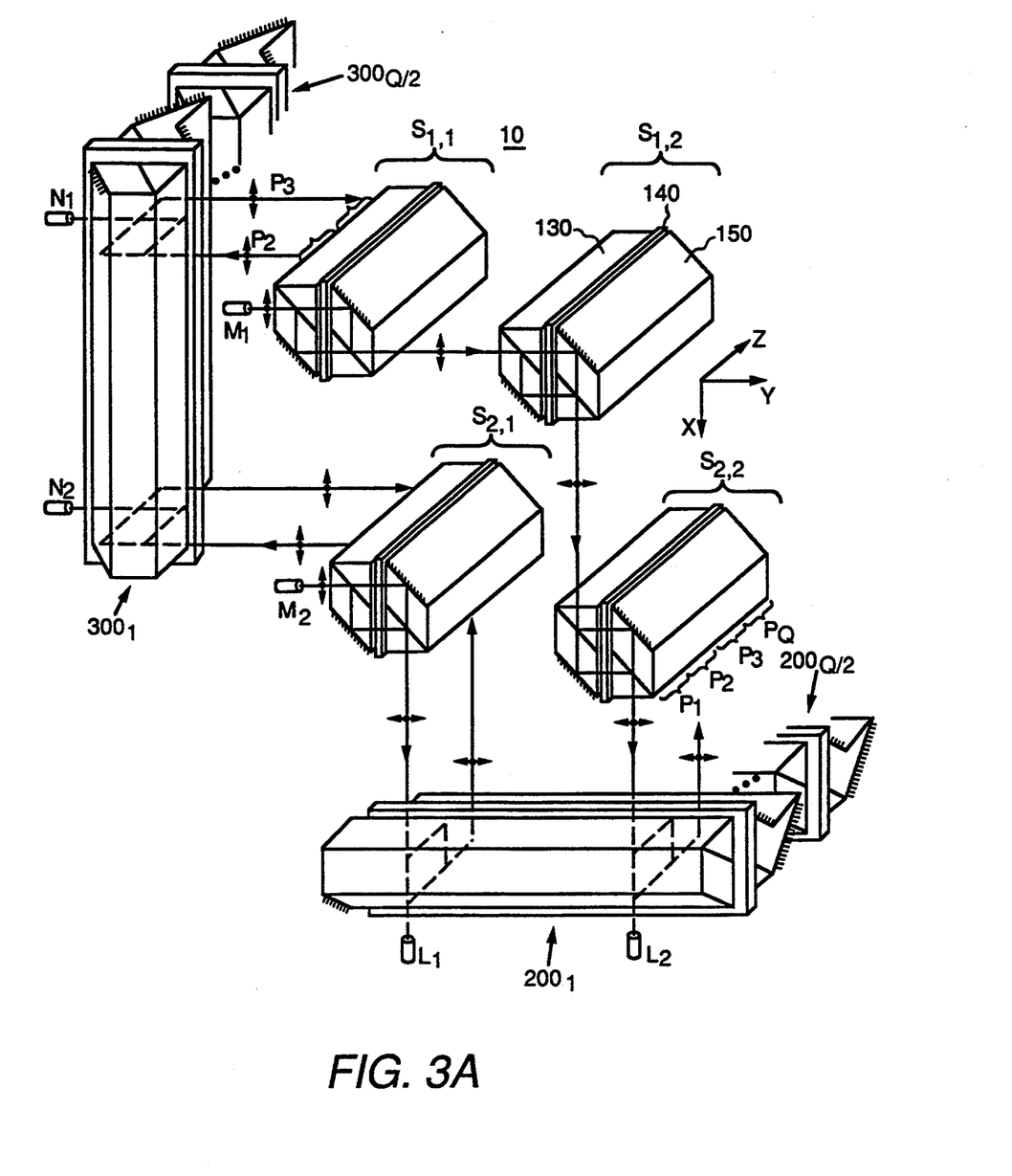
FIG. 3A is a schematic perspective view of another embodiment in accordance with the present invention.

FIG. 3A illustrates a switching device 10 which comprises a succession of stacked switching matrices identified by alternate odd and even numbers (e.g., P₁, P₂, P₃ ... $P_Q$). In general device 10 comprises a plurality of Q matrices substantially similar to the one illustrated and described in the context of FIG. 1. Each of the Q matrices is positioned in parallel alignment with each other across a common axis perpendicular to their rows and columns (e.g. the Z axis extending perpendicular the X and Y axes). As illustrated in FIG. 3A, respective optical components of successive PISCs $S_{i,j}$ in each of the Q switching matrices may be constructed integral to each other. Thus, each SLM located in the same ith row and jth column of successive matrices (P₁, P₂ ... $P_Q$) may be formed by a single elongated SLM extending parallel to the Z axis (e.g., SLM 140). A similar integral construction may also be provided for each of the first and second switch units of successive PISCs $S_{i,j}$ (e.g., first switch unit 130 and second switch unit 150). This integral construction reduces manufacturing costs as well as optical misalignment between each successive switching cell. FIG. 3A further illustrates row reflecting means $200_1, \ldots 200_{Q/2}$ each capable of optically coupling an associated pair of consecutive switching matrices in which an odd matrix is followed by an even matrix. For example, row reflecting means $200_1$ is capable of optically coupling switching matrix $P_1$ to matrix $P_2$.

Figure 3B:
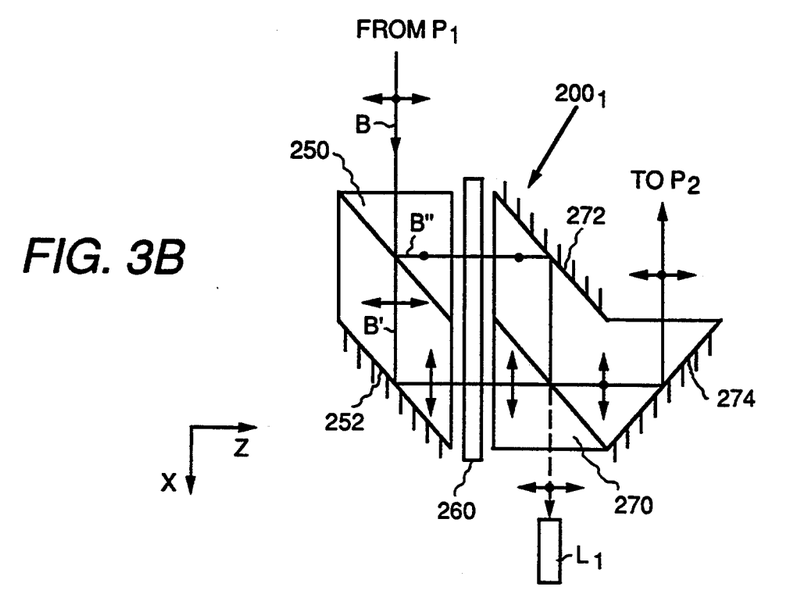
FIG. 3B is a side elevation view of the row reflecting means shown in FIG. 3A.

As illustrated in FIG. 3B, each row reflecting means (e.g., $200_1$) comprises a first row end polarizing beamsplitter 250 optically coupled to receive arbitrarily polarized optical beams from the last row of a predetermined odd matrix (e.g., matrix $P_1$). First row end polarizing beamsplitter 250 splits each received optical beam (e.g., beam B) into a constituent pair of beams (e.g. beams B' and B'') having mutually orthogonal polarization orientations. First row end polarizing beamsplitter 250 cooperates with an associated first reflector 252 to direct beams B' and B'' along the common axis (here the Z axis). A row end SLM 260 is optically coupled to receive beams B' and B'' directed along the common axis.

The row end SLM 260 typically includes an army of individually controllable pixels capable of selectively rotating the polarization orientation of each beam pair passing therethrough. The row reflecting means further comprises a second row end polarizing beamsplitter 270 and an associated second reflector 272 optically coupled to combine each constituent beam pair received from the row end SLM 260. In particular a beam pair having its polarization orientation simultaneously rotated by 90° in SLM 260 is recombined in the second row end PBS 270 to form an arbitrarily polarized optical beam (represented by the dashed line) directed to a selected output port (e.g. $L_1$) associated with the row reflecting means, while a beam pair not experiencing polarization rotation (as specifically exemplified in FIG. 3B) is recombined to form an arbitrarily polarized optical beam directed along the Z axis. A third reflector 274 is optically coupled to receive the arbitrarily polarized beam along the Z axis and to deflect each received optical beam to the last row of PISCs of the next subsequent even matrix (e.g., matrix $P_2$) for further propagation within that subsequent even matrix.

FIG. 3A also illustrates column reflecting means $300_1 \ldots 300_{Q/2}$ each capable of optically coupling an associated pair of consecutive switching matrices in which an even matrix is followed by an odd matrix. For example, column reflecting means $300_1$ is capable of optically coupling switching matrix $P_2$ to matrix $P_3$.

Figure 3C:
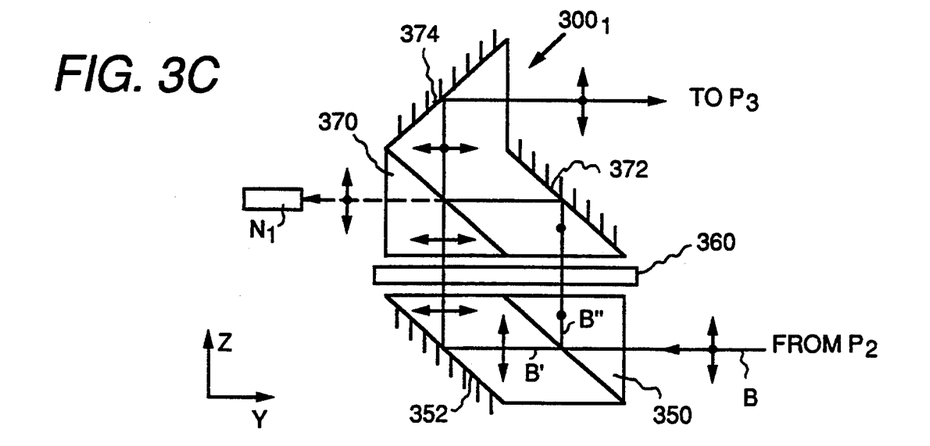
FIG. 3C is a top plan view of the column reflecting means shown in FIG. 3A.

In FIG. 3C, each column reflecting means is shown to comprise a first column end polarizing beamsplitter 350 optically coupled to receive arbitrarily polarized optical beams from the first column of a predetermined even matrix (e.g., matrix $P_2$). First column end polarizing beamsplitter 350 splits each received optical beam (e.g., beam B) into a constituent pair of beams (e.g. beams B' and B'') having mutually orthogonal polarization orientations. First column end polarizing beamsplitter 350 cooperates with an associated first reflector 352 to direct beams B' and B'' along a common axis (here the Z axis). A column end SLM 360 is optically coupled to receive beams B' and B'' directed along the common axis.

The column end SLM 360 typically includes an array of individually controllable pixels capable of selectively rotating the polarization orientation of each beam pair passing therethrough. The column reflecting means further comprises a second column end polarizing beamsplitter 370 and an associated second reflector 372 optically coupled to combine each constituent beam pair received from the row end SLM 360. In particular a beam pair having its polarization orientation simultaneously rotated by 90° recombines to form an arbitrarily polarized optical beam (represented by the dashed line) directed to a selected output port (e.g., $N_1$) associated with the column reflecting means, while a beam pair not experiencing polarization rotation (as specifically exemplified in FIG. 3C) is recombined to form an arbitrarily polarized optical beam directed along the common axis (here the Z axis). A third reflector 374 is optically coupled to receive the arbitrarily polarized optical beam along the common axis and to deflect each received optical beam to the first column of PISCs of the next subsequent odd matrix (e.g., matrix $P_3$) for further propagation within that subsequent odd matrix.

In accordance with the embodiment of FIG. 3A, in each PISC of an odd matrix the SLM and first and second switch units cooperate to propagate optical beams through the odd matrix in ascending column order within a row and in ascending row order within a column, while in each PISC of an even matrix the SLM and first and second switch units cooperate to propagate signal beams through the even matrix in descending row order within a column and in descending column order within a row so that redirected optical beams may be switched to selected output ports.

In another aspect of the invention, the respective pixels of the SLM of a PISC may be set to rotate the polarization orientation of the optical beams passing them through by an angle of about 45°. Optical beams with this 45° polarization orientation recombine to form two optical beams simultaneously emerging along both the first and second axes for further propagation within the switching matrix. In accordance with this aspect of the invention each of the externally derived optical beams can be simultaneously directed to at least two selected output ports of the switching matrix.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An optical switching device having input ports and output ports, for simultaneously and individually directing a plurality of externally derived arbitrarily polarized optical signal beams received through at least one of said input ports to a selected plurality of said output ports of said device, said device comprising:

a first switching matrix comprising a plurality of polarization-independent switching cells arranged in columns and rows, each of said polarization-independent switching cells independently controllable such that individual optical beams received by each respective one of said switching cells can respectively emerge therefrom along a selected one of first and second axes;

each polarization-independent switching cell located in a first column of said matrix being positioned to receive a portion of said plurality of externally derived optical beams;

each polarization-independent switching cell in a predetermined column of said matrix subsequent to said first column being optically coupled to receive optical beams passed along said selected second axis from a polarization-independent switching cell located in a preceding column of the same row, and each polarization-independent switching cell in a predetermined row of said matrix subsequent to a first row of said matrix being optically coupled to receive optical beams passed along said selected first axis from a switching cell located in a preceding row of the same column; and each switching cell in the last row of said matrix being optically coupled to pass optical beams from within said matrix to said selected output ports;

whereby externally derived arbitrarily polarized optical signal beams applied simultaneously through said at least one of said input ports to the first column of switching cells can propagate through said matrix so as to reach said selected plurality of output ports without mutual interference.

2. An optical switching device according to claim 1 wherein each of said polarization-independent switching cells comprises:

a first switch unit including respective polarizing beamsplitter means disposed to operate on optical beams received by said polarization-independent switching cell;

a spatial light modulator optically coupled to said first switch unit, said spatial light modulator comprising an array of individually controllable pixels capable of selectively rotating the polarization orientation of optical beams passing therethrough; and a second switch unit optically coupled to said spatial light modulator, said second switch unit comprising respective polarizing beamsplitter means disposed to pass optical beams along either said first selected axis or said selected second axis, in accordance with the polarization orientation imparted by the spatial light modulator pixels to optical beams passing therethrough.

3. An optical switching device according to claim 2 and further comprising at least one lens optically coupled between adjacent ones of said polarization-independent switching cells and situated to focus optical beams passing therethrough.

4. An optical switching device according to claim 3 wherein said device comprises a succession of additional switching matrices substantially identical to said first matrix, said first matrix and said additional matrices comprising stacked matrices identified by alternate odd and even designations, said matrices being positioned in parallel alignment with each other across a common axis perpendicular to the rows and columns of said stacked matrixes.

5. An optical switching device according to claim 4 and further comprising row reflecting means capable of optically coupling each pair of consecutive stacked matrices in which an odd matrix is followed by an even matrix;

each of said row reflecting means comprising a first row end polarizing beamsplitter and a first row end reflector, said first row end polarizing beamsplitter optically coupled to receive arbitrarily polarized optical beams from the last row of said odd matrix and to split each received optical beam into a constituent pair of beams having mutually orthogonal polarizations, said first row end reflector cooperating with said first row end polarizing beamsplitter to direct each of said beam pairs along said common axis;

a row end spatial light modulator optically coupled to receive said directed beam pairs, said row end spatial light modulator including an array of individually controllable pixels patterned such that each of said beam pairs from said first row end polarizing beamsplitter passes through a respective pixel pair, each of said pixel pairs in said row end spatial light modulator being capable of selectively rotating the polarization orientation of each beam pair passing therethrough;

each of said row reflecting means further comprising a second row end polarizing beamsplitter and second and third row end reflectors, said second row end polarizing beamsplitter and said second row end reflector being optically coupled to combine each constituent beam pair received from said row end spatial light modulator such that a beam pair having its polarization orientation simultaneously rotated by 90° forms an arbitrarily polarized optical beam directed to an output port associated with said row reflecting means, while an unrotated beam pair forms an arbitrarily polarized optical beam directed along said common axis toward said third row end reflector, said third row end reflector being disposed to optically couple incident optical beams to the last row cell of the next subsequent even matrix for further propagation within said subsequent even matrix;

whereby arbitrarily polarized optical beams received by said subsequent even matrix may be switched to said selected plurality of output ports by way of the polarization-independent switching cells located in said subsequent even matrix.

6. An optical switching device according to claim 5 and further comprising column reflecting means capable of optically coupling each pair of consecutive stacked matrices in which an even matrix is followed by an odd matrix;

each of said column reflecting means comprising a first column end polarizing beamsplitter and a first column end reflector, said first column end polarizing beamsplitter optically coupled to receive arbitrarily polarized optical beams from the first column of said even matrix and to split each received optical beam into a constituent pair of beams having mutually orthogonal polarization orientations, said first column end polarizing beamsplitter cooperating with said first column end reflector to direct each of said beam pairs along said common axis;

a column end spatial light modulator optically coupled to receive said directed beam pairs, said column end spatial light modulator including an array of individually controllable pixels patterned such that each of said beam pairs from said first column end polarizing beamsplitter passes through a respective pixel pair, each of said pixel pairs in said column end spatial light modulator being capable of selectively rotating the polarization orientation of each beam pair passing therethrough;

each of said column reflecting means further comprising a second column end polarizing beamsplitter and second and third column end reflectors, said second column end polarizing beamsplitter and said second column end reflector being optically coupled to combine each constituent beam pair received from said column end spatial light modulator such that a beam pair having its polarization orientation simultaneously rotated by 90° forms an arbitrarily polarized beam directed to an output port associated with said column reflecting means, while an unrotated beam pair forms an arbitrarily polarized beam directed along said common axis toward said third column end reflector, said third column end reflector being disposed to optically couple incident optical beams to the fast column cell of the next subsequent odd matrix for further propagation within said subsequent odd matrix;

whereby each polarization-independent switching cell of a predetermined odd matrix cooperates to propagate optical beams through said predetermined odd matrix in ascending column order within a row and in ascending row order within a column, and each polarization-independent switching cell of a predetermined even matrix cooperates to propagate optical beams through said predetermined even matrix in descending row order within a column and in descending column order within a row.

7. An optical switching device according to claim 6 wherein each first switch unit of polarization-independent switching cells identically located in each of said stacked matrices is integral to each other so as to form an elongated first switch unit extending substantially parallel to said common axis.

8. An optical switching device according to claim 6 wherein each spatial light modulator of polarization-independent switching cells identically located in each of said stacked matrices is integral to each other so as to form an elongated spatial light modulator extending substantially parallel to said common axis.

9. An optical switching device according to claim 6 wherein each second switch unit of polarization-independent switching cells identically located in each of said stacked matrices is integral to each other so as to form an elongated second switch unit extending substantially parallel to said common axis.

10. An optical switching device according to claim 6 wherein:

each first switch unit of polarization-independent switching cells identically located in each of said stacked matrices is integral to each other so as to form an elongated first switch unit extending substantially parallel to said common axis;

each spatial light modulator of polarization-independent switching cells identically located in each of said stacked matrices is integral to each other so as to form an elongated spatial light modulator extending substantially parallel to said common axis; and each second switch unit of polarization-independent switching cells identically located in each of said stacked matrices is integral to each other so as to form an elongated second switch unit extending substantially parallel to said common axis.

11. An optical switching device according to claim 10 wherein each of said polarization-independent switching cells is capable of simultaneously directing each received optical beam, in accordance with the polarization rotation imparted by the spatial light modulator to optical beams passing therethrough, along both of said first and second axes for further propagation within said device;

whereby each externally derived arbitrarily polarized optical signal beam can be simultaneously directed to at least two of said selected plurality of output ports of said device.

12. An optical switching device according to claim 2 wherein each of said polarization-independent switching cells is capable of simultaneously directing each received optical beam, in accordance with the polarization rotation imparted by the spatial light modulator to optical beams passing therethrough, along both of said fast and second axes for further propagation within said device;

whereby each externally derived arbitrarily polarized optical signal beam can be simultaneously directed to at least two of said selected plurality of output ports of said device.

13. An optical switching device having a plurality of ports, for simultaneously and individually directing a plurality of externally derived arbitrarily polarized optical signal beams to selected ones of said plurality of ports, said device providing bidirectional communication between predetermined ones of said ports and comprising:

a switching matrix comprising a plurality of polarization-independent switching cells arranged in columns and rows, each of said polarization-independent switching cells independently controllable such that individual optical beams received by each respective one of said switching cells can respectively emerge therefrom along a selected one of first and second axes;

each polarization-independent switching cell located in a first column of said matrix and each polarization-independent switching cell located in a last row of said matrix being positioned to receive respective portions of said plurality of externally derived optical beams or to pass optical beams from within said matrix to said ports; and each polarization-independent switching cell in a column of said matrix subsequent to said first column being optically coupled to receive or to pass optical beams with respect to a switching cell located in a preceding column of the same row, and each polarization-independent switching cell in a row of said matrix preceding said last row being optically coupled to receive or to pass optical beams with respect to a switching cell located in a subsequent row of the same column;

whereby externally derived optical signal beams applied simultaneously through at least one of said ports, other than said selected ones of said plurality of ports, to the first column of switching cells or the last row of switching cells can propagate through said matrix so as to reach said selected ones of said plurality of ports without mutual interference.

14. An optical switching device according to claim 13 wherein each of said polarization-independent switching cells comprises:

a first switch unit including a respective polarizing beamsplitter means disposed to operate on optical beams received or passed by said polarization-independent switching cell;

a spatial light modulator optically coupled to receive or to pass optical beams with respect to said first switch unit, said spatial light modulator comprising an array of individually controllable pixels capable of selectively rotating the polarization orientation of optical beams passing therethrough; and a second switch unit comprising polarizing beamsplitter means optically coupled to receive or to pass optical beams with respect to said spatial light modulator, each of said first and second switch units capable of selectively directing passed optical beams along either said first selected axis or said second selected axis, in accordance with the polarization orientation imparted by the spatial light modulator pixels to optical beams passing therethrough.

15. An optical switching device according to claim 14 and further comprising at least one lens optically coupled between adjacent ones of said polarization-independent switching cells and situated to focus optical beams passing therethrough.

16. An optical switching device according to claim 15 wherein each of said polarization-independent switching cells is capable of simultaneously directing each received optical beam, in accordance with the polarization rotation imparted by the spatial light modulator to optical beams passing therethrough, along both of said first and second axes for further propagation within said matrix;

whereby each externally derived arbitrarily polarized optical signal beam can be simultaneously directed to at least two selected ones of said plurality of ports.

17. An optical switching device according to claim 13 wherein each of said polarization-independent switching cells is capable of simultaneously directing each received optical beam, in accordance with the polarization rotation imparted by the spatial light modulator to optical beams passing therethrough, along both of said first and second axes for further propagation within said matrix;

whereby each externally derived arbitrarily polarized optical signal beam can be simultaneously directed to at least two selected ones of said plurality of ports.

* * * * *